United States Patent [19]
Guendel

[11] Patent Number: 6,134,293
[45] Date of Patent: Oct. 17, 2000

[54] IMAGE RECONSTRUCTION METHOD FOR COMPUTED TOMOGRAPHY

[75] Inventor: Lutz Guendel, Erlangen, Germany

[73] Assignee: Siemens Aktiengesellschaft, Munich, Germany

[21] Appl. No.: 09/243,542

[22] Filed: Feb. 3, 1999

[30] Foreign Application Priority Data

Feb. 4, 1998 [DE] Germany .................. 198 04 382

[51] Int. Cl.⁷ ...................................... A61B 6/03
[52] U.S. Cl. ................................. 378/4; 378/901
[58] Field of Search ................... 378/4, 15, 901

[56] References Cited

U.S. PATENT DOCUMENTS 5,416,817  5/1995  Ruehrnschopf ............... 378/19
5,498,961  3/1996  Kuhn et al. ................... 324/209
5,875,225  2/1999  Wallschlaeger ................ 378/15

*Primary Examiner*—David V. Bruce
*Attorney, Agent, or Firm*—Hill & Simpson

[57] ABSTRACT

In an image reconstruction method for computed tomography the reconstruction of an image from datasets is accelerated so that, with adequate image quality, dynamic studies of moving organs or monitoring of moving therapeutic instruments are possible. To this end, data segments for a sub-scan reconstruction are taken from the continuously measured and pre-processed data stream. The starting angle of the individual data segments is not restricted to a fixed grid. The grid can be arbitrarily defined according to the current computing capability of the reconstruction computer.

7 Claims, 3 Drawing Sheets

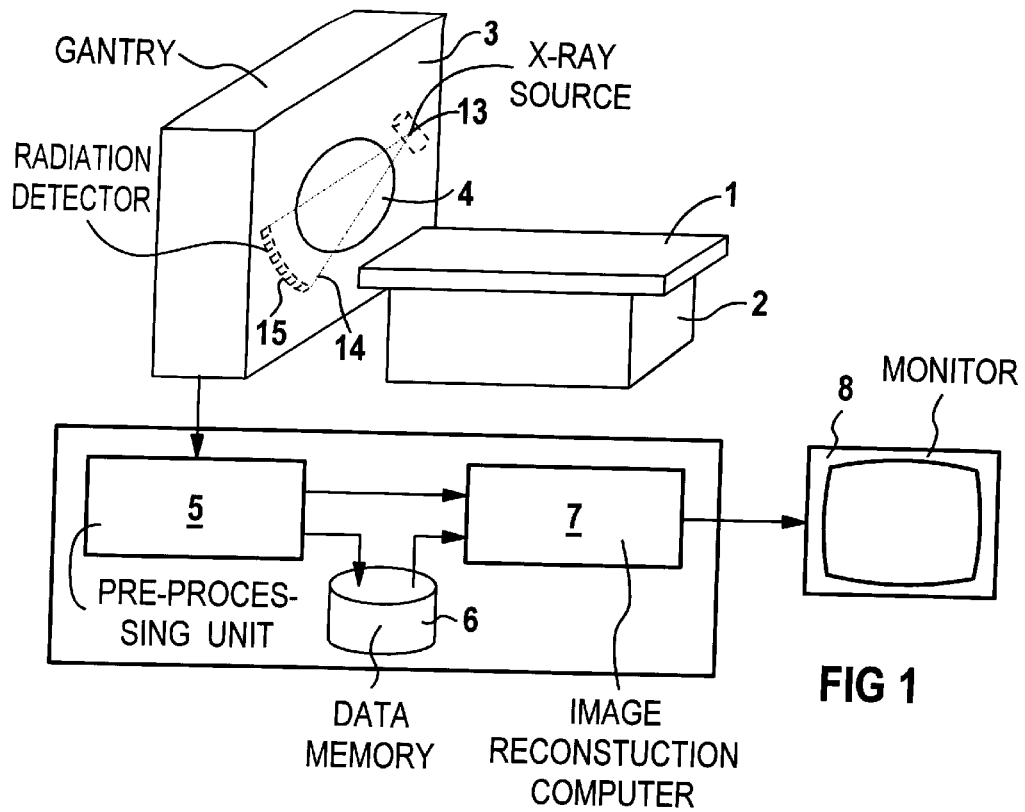
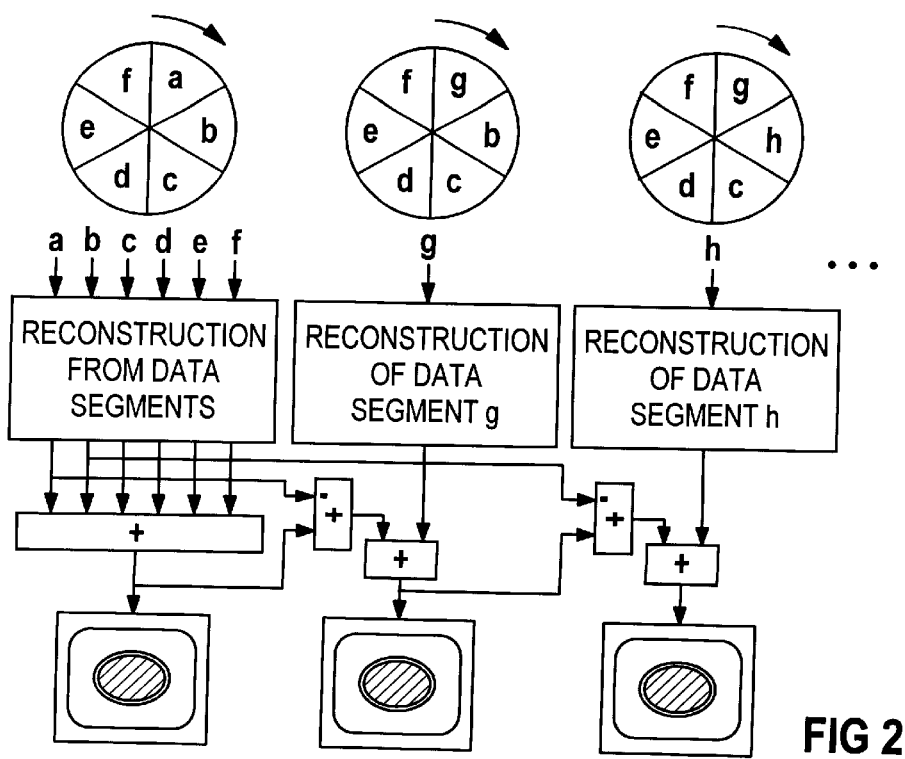

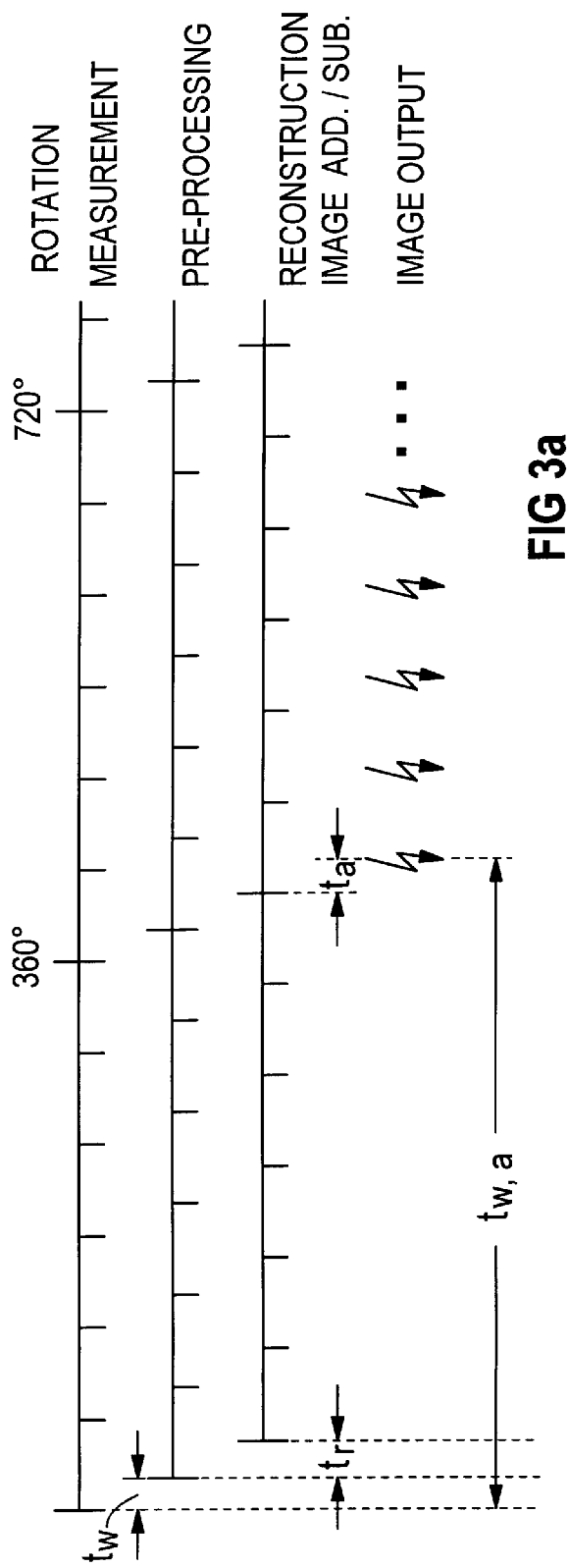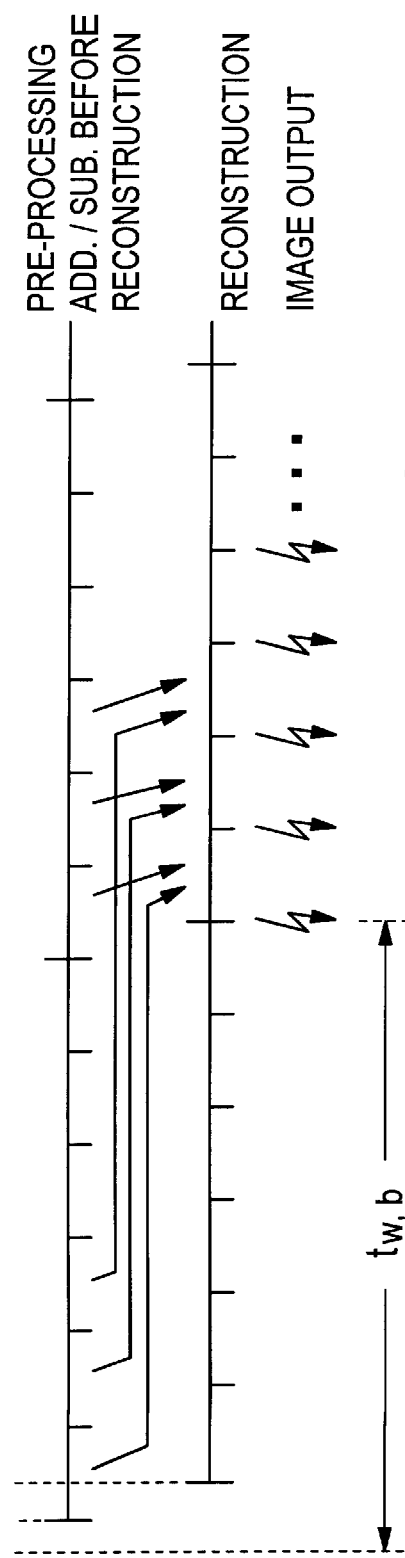

IMAGE RECONSTRUCTION METHOD FOR COMPUTED TOMOGRAPHY

BACKGROUND OF THE INVENTION

1. Field of the Invention

The present invention is directed to an image reconstruction method of the type suitable for use in computed tomography.

2. Description of the Prior Art

Image reconstruction methods for computed tomography conducted with an apparatus having a pre-processing unit for the data signals of the detector and a following reconstruction unit for the image reconstruction, from which information is supplied to a monitor for image playback, wherein the data stream is continuously measured and pre-processed are disclosed, for example, in German OS 43 19 538 and German OS 196 25 863.

In a computed tomography apparatus, images of the examined region of the patient are reconstructed from the data supplied by the detector. The operation of a conventional computed tomography apparatus is explained in greater detail with reference to FIGS. 1 and 2.

FIG. 1 shows a patient bed 1 on a base 2 to which the gantry 3 of a computed tomography apparatus with a measurement opening 4 is allocated, a patient on the bed 1 being introducible into the measurement opening 4. FIG. 1 also shows the focus 13 of an X-ray source that emits a fan-shaped X-ray beam 14 that strikes a detector 15 composed of a row of detector elements ($3^{rd}$ generation). The focus 13 and the detector 15 rotate around the patient so that the patient is irradiated from different directions (projection angles). The data delivered by the detector 4 are supplied to a pre-processing unit 5, which is followed by a data memory 6 and a reconstruction unit 7. The image playback ensues on a monitor 8.

A specific reconstruction algorithm is based on detector signals that are supplied to the image computer from a segment of a revolution of the focus 13 of the X-ray source and the detector 15.

The CT image m is reconstructed with this algorithm from the segment images $n_a=m$ through $n_e=m-1+K$, with K being the number of segments of a 60° revolution. The CT image m arises by addition of CT image m−1 and the segment image from the data segment $n_e$ and subtraction of the segment image from the data segment $n_a-1$.

The left-most image in FIG. 2 shows how six segment images are calculated and added in an initialization phase, for example from k=6 data segments a through f of 60° each. The middle image in FIG. 2 shows how the seventh segment image is reconstructed from the data segment g after another 60° revolution. The desired CT image is derived by addition of the segment image from the data segment g and the previous CT image as well as by subtraction of the segment image from the data segment a. The right-most image in FIG. 2 shows how the algorithm reconstructs the eighth segment image from a further 60° data segment h. The third CT image arises in that it is added to the previous CT image, and the second segment image (from the data segment b) is subtracted from the result. This algorithm is then continued for the following segments.

In an alternative realization, the suitably edited data of the corresponding segments are subtracted from one another, or are added instead of the images.

The two described algorithms have basic disadvantages: The 360° revolution must be divided into a number of segments which is a whole-number, so that the calculating time of the existing reconstruction unit 7 allows an on-line processing of the measured data. An optimum usage, and thus the maximum calculating speed of the reconstruction unit, are not possible.

The delay time between the motion of a subject in the measuring field of the computed tomography apparatus and the presentation is comparatively large and, for example, complicates therapeutic applications.

Due to the basic operating principle, the measured data of the detector must be pre-processed on-line, i.e. the data of a revolution must be processed within the revolution time $t_u$. The data are thereby delayed by a time $t_w$. The subsequent reconstruction must likewise occur on-line, i.e. the reconstruction of, for example, a 60° segment cannot last longer than the time for ⅙ revolution. The data are thereby delayed by the time $t_r$ and the addition and subtraction of the segment images lasts for the time $t_a$. The waiting time from the start of radiation emission until the first image amounts to $t_{w,a}=t_w+t_r+t_a+t_u$ (FIG. 3a).

The waiting time is shorter when the pre-processed data are added or subtracted by segments (FIG. 3b). It amounts to $t_{w,b}=t_w+t_r+t_u$. The reconstruction computer 7, however, must be designed with higher performance since it must conduct the addition or subtraction of the pre-processed data segments in the same time.

SUMMARY OF THE INVENTION

An object of the present invention is to provide an image reconstruction method for a computed tomography apparatus, wherein the reconstruction is accelerated compared to known methods and wherein, with an adequate image quality, dynamic studies of moving organs or the monitoring of moving therapeutic instruments are possible. The delay between subject motion and the motion presented in the displayed image sequence should be as slight as possible.

The above object is achieved in accordance with the principles of the present invention in an image reconstruction method for use in a computed tomography apparatus having an X-ray source and a radiation detector for conducting a scan of a subject by rotating around the subject to generate a continuous measurement data stream while irradiating said subject from different rotational angles, and image reconstruction computer and a monitor on which an image of the subject reconstructed by the image reconstruction computer is displayed, the image reconstruction method including the steps of taking successive data segments from the continuous measurement data stream, said data segments respectively comprising data generated beginning from different starting rotational angles of said X-ray source, using the data segments for sub-scan image reconstructions/in *) the image reconstruction computer, and selecting the respective starting rotational angles for the respective data segments according to a reconstruction grid for the sub-scan reconstructions which substantially maximizes the computing capacity of the image reconstruction computer.

The basis for the inventive method is that data segments for a sub-scan reconstruction are taken from the continuously measured, pre-processed data stream.

*), i.e. images based on data acquired over a rotational angle of less then 360°, The starting angle of the individual reconstruction therefore is not restricted to a fixed grid as in known methods. On the contrary, the grid is arbitrarily defined according to the computing capacity of the reconstruction unit available at the moment (current computing capacity). The inventive image reconstruction method thus allows a flexible adaptation to an existing reconstruction unit, allowing the existing computing capacity to be maximally utilized.

DESCRIPTION OF THE DRAWINGS

FIG. 1, as noted above, is a schematic diagram illustrating the basic components of a conventional computed tomography apparatus.

FIG. 2, as noted above, schematically illustrates an image reconstruction method commonly employed in conventional computed tomography image reconstruction.

FIGS. 3a and 3b, as noted above illustrate details of the conventional image reconstruction method.

DESCRIPTION OF THE PREFERRED EMBODIMENTS

Figure 4:
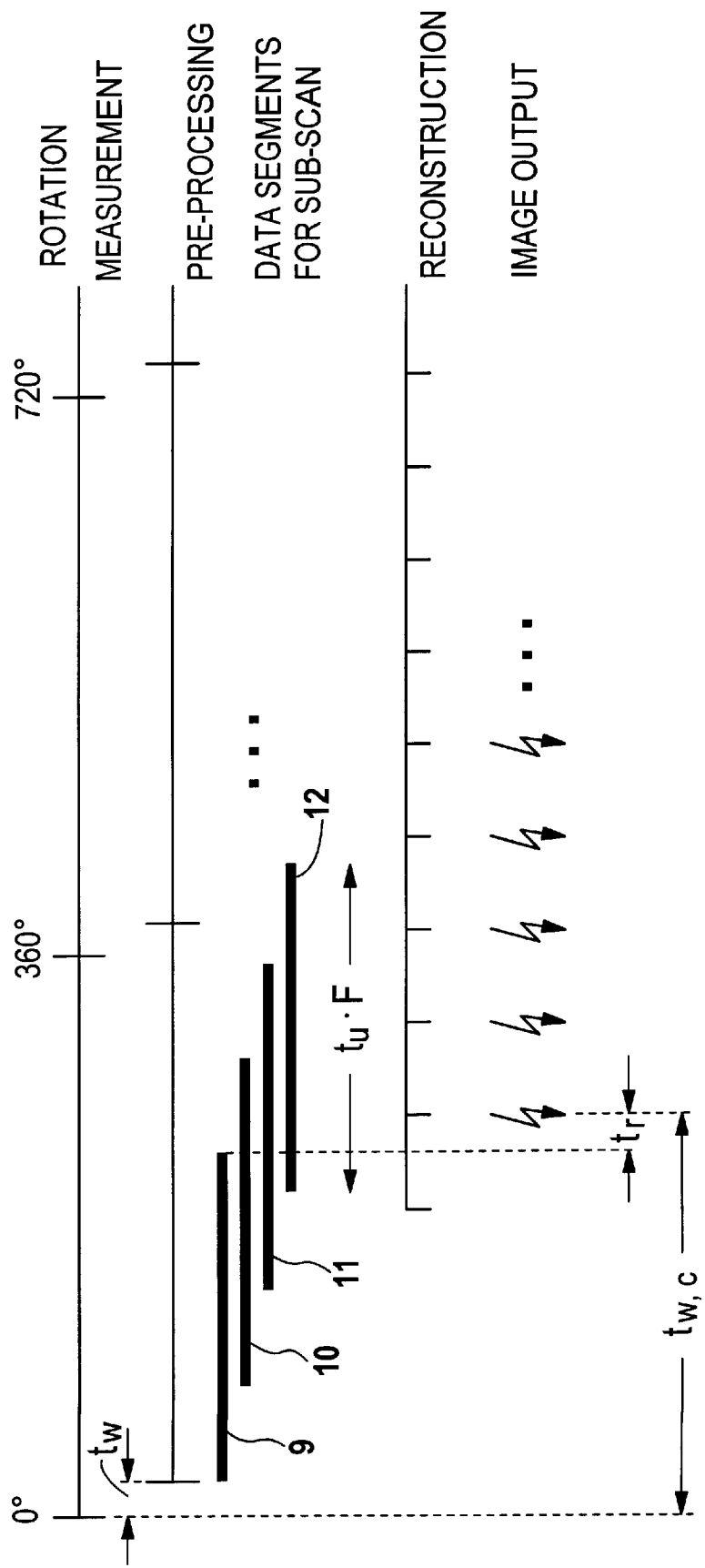
FIG. 4, illustrates the inventive image reconstruction method.

FIG. 4 illustrates the inventive method by schematically showing the relationship among data segments which are used for respective sub-scan image reconstructions. The data employed in the inventive method are obtained in the same manner as described above using a conventional computed tomography system, however, the image reconstruction computer 7 shown therein is programmed differently from the conventional manner, i.e., it is programmed to practice the inventive method illustrated in FIG. 4.

As can be seen from FIG. 4, the data segments 9 through 12 for a sub-scan are not restricted to a fixed grid but are arbitrarily defined, and in fact overlap in the example.

The use of a new algorithm wherein data segments for a sub-scan reconstruction are taken from the continuously measured and pre-processed data stream is necessary for processing the data in the manner shown in FIG. 4. The starting angle of the individual reconstruction is thereby not restricted to a fixed grid as in known methods. The grid can be arbitrarily defined according to the currently available computing capacity of the reconstruction computer (FIG. 4).

Given movement of the bed 1, this method offers a higher spatial resolution due to the sub-scan algorithm. Without movement of the bed 1, a high time resolution is achieved in dynamic studies. Moreover, the waiting time $t_{w,c}=t_w+t_r+t_u \cdot F$ is significantly shorter. The factor F determines how many data points are required for the reconstruction of the sub-scan compared to 360° reconstruction. The factor F varies between 0.52 and the value of 0.5 +fan angle/360° standard for sub-scan. The reduced waiting time is especially effective given the start-stop operation that is standard in this mode.

The remainder of the image reconstruction (acting on data supplied according to FIG. 4) can be implemented with known reconstruction methods such as, for example, filtered back-projection methods or Fourier methods, based on fan or parallel beams for computed tomography systems of the $3^{rd}$, $4^{th}$ or $5^{th}$ generation ($5^{th}$ generation being a system with a number of rotating foci), and using single-line and multi-line, or planar detector system. The data rate can be reduced by interpolation over the individual detector channels, by interpolation over the individual projections and, possibly, over the data of different detector lines. Additionally, the reconstruction matrix is reduced, with the image presentation by interpolation ensuing with a larger matrix. The described data reductions can be applied individually or in combination. The data reduction can ensue directly on the measured data or on the pre-processed data. An increase in speed thus is already possible in the pre-processing, or can be achieved by virtue of the reconstruction ensuing at a higher speed. A reconstruction with high image quality of an individual slice or a number of slices, on the basis of stored data pre-processed in the described way then ensues. The measured data may be intermediately stored before the data reduction.

Alternatively, however, image reconstruction can be carried out without data but image matrix reduction and with a correspondingly high-performance reconstruction computer.

When the data pre-processed on-line are stored on disk or when a data buffer is present in the reconstruction unit for storing data from a sub-scan, or for storing the data from the most recent 360° rotation, then a reconstruction with high image quality can ensue following the high-speed reconstruction. Dependent on the demands made on the reconstruction speed or image quality, the described data reduction can be disenabled individually, in combinations or entirely. In start-stop mode, the last measured dataset reconstructed with high quality then appears at the monitor. When the switchover is triggered by an interruption of the input data or an interruption of the X-rays, then such a reconstruction is possible at any time without serious interruption of the examination sequence. The high-quality image can then be permanently displayed either at a separate monitor or in a different image segment in the same monitor.

The described algorithm accesses overlapping data segments. This does not automatically mean that the data need to be completely newly reconstructed. On the contrary, the disclosed algorithm allows projections from reconstruction n-1 to continue to be employed in reconstruction n.

As already explained, the reconstruction grid can be flexibly adapted to the existing computing capacity of the reconstruction unit. If a data-independent reconstruction time is assumed, then an equidistant reconstruction grid is used. Alternatively, however, the time grid can be selected non-equidistant. For example, this can ensue with an external trigger (ECG trigger). As a result, cardiac activity triggered exposures are possible even given high pulse frequencies or a number of defined exposures are also possible within one heart period. Moreover, the reconstruction intervals can be adapted on-line to the current contrast agent concentration, for example, when tracking a contrast agent bolus.

Although modifications and changes may be suggested by those skilled in the art, it is the intention of the inventor to embody within the patent warranted hereon all changes and modifications as reasonably and properly come within the scope of his contribution to the art.

I claim as my invention:

1. In a computed tomography apparatus having an X-ray source and a radiation detector for conducting a scan of subject by rotating around said subject to generate a continuous measurement data stream while irradiating said subject from different rotational angles, an image reconstruction computer having a computing capacity, and a monitor on which an image of said subject reconstructed by said image reconstruction computer is displayed, the improvement of a method for reconstructing said image of said subject in said image reconstruction computer comprising the steps of:

taking successive data segments from said continuous measurement data stream, said data segments respectively comprising data generated beginning from different starting rotation angles of said X-ray source;

using said data segments for respective sub-scan image reconstructions in said image reconstruction computer; and selecting the respective starting rotational angles for said data segments according to a reconstruction grid for said sub-scan reconstructions which substantially maximally utilizes said computing capacity of said image reconstruction computer.

2. A method as claimed in claim 1 wherein the step of taking successive data segments from said continuous measurement data stream comprises taking overlapping data segments from said continuous measurement data stream.

3. A method as claimed in claim 1 wherein said reconstruction grid comprises an equidistant grid and wherein said image reconstruction computer reconstructs said image with a reconstruction time which is independent of said measurement data.

4. A method as claimed in claim 1 wherein said reconstruction grid comprises a non-equidistant grid.

5. A method as claimed in claim 1 wherein said radiation detector comprises a plurality of detector elements each having a detector channel associated therewith, and wherein said continuous measurement data stream comprises data from all of said channels, and comprising the additional step of undertaking a group interpolation of said measurement data over a plurality of said detector channels.

6. A method as claimed in claim 1 comprising the additional step of conducting a group interpolation of measurement data from a plurality of different rotational angles of said X-ray source.

7. A method as claimed in claim 1 comprising employing a reduced-size reconstruction matrix in said image reconstruction computer.

* * * * *